UNITED STATES PATENT OFFICE.

ADOLF KIRCHER, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

SALT OF HEXAMETHYLENETETRAMIN AND PROCESS OF MAKING SAME.

1,064,227. Specification of Letters Patent. Patented June 10, 1913.

No Drawing. Application filed September 18, 1912. Serial No. 721,027.

*To all whom it may concern:*

Be it known that I, ADOLF KIRCHER, Ph. D., chemist, a citizen of the Empire of Germany, residing at Sindlingen, near Höchst-on-the-Main, Germany, have invented certain new and useful Improvements in a Salt of Hexamethylenetetramin and Process of Making Same, of which the following is a specification.

I have found that a new compound of great therapeutical value is obtained by causing two molecules of hexamethylenetetramin and one molecule of camphoric acid to act upon each other in presence of an indifferent solvent, such, for instance, as methyl-alcohol, chloroform, ethyl-acetate or the like.

The hexamethylenetetramin camphorate thus produced has the formula:

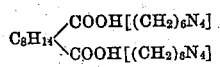

It is a white body, easily crystallizing in well-formed needles, particularly from ethyl-acetate; it is readily soluble in cold water (in the proportion of 1:10), still more readily soluble in tepid water, also in ethyl-alcohol and methyl-alcohol, but is rather difficultly soluble in chloroform and benzene.

The new product is used very successfully in the treatment of cystitis, and it has proved to be a very efficacious remedy for curing this disease while its action is not attended by any undesirable secondary effects such as accompany the use of the hexamethylenetetramin itself. The administration of the new product causes an increase of diuresis, rendering alkaline urine acid in reaction and clarifying urine which has become turbid by catarrhal affections.

Example: 140 grams of hexamethylenetetramin and 100 grams of camphoric acid are dissolved while heating in a sufficient quantity of chloroform; after cooling, ligroin is added until the mass begins to become turbid, whereupon the camphorate is allowed to separate.

Having now described my invention, what I claim is:

1. The process of preparing a new salt of hexamethylenetetramin, which consists in causing two molecules of hexamethylenetetramin to act upon one molecule of camphoric acid in the presence of an indifferent solvent.

2. As a new product, the hexamethylenetetramin camphorate of the formula:

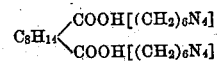

being a white body, crystallizing from ethyl-acetate in well-formed needles, readily soluble in water, ethyl-alcohol and methyl-alcohol, more difficultly soluble in chloroform and benzene.

In testimony whereof, I affix my signature in presence of two witnesses.

ADOLF KIRCHER.

Witnesses:
 JEAN GRUND,
 CARL GRUND.